US010588003B2

(12) United States Patent
Barsness et al.

(10) Patent No.: US 10,588,003 B2
(45) Date of Patent: *Mar. 10, 2020

(54) NOTIFICATION OF POTENTIALLY PROBLEMATIC TEXTUAL MESSAGES

(71) Applicant: International Business Machines Corporation, Armonk, NY (US)

(72) Inventors: Eric L. Barsness, Pine Island, MN (US); Jay S. Bryant, Rochester, MN (US); James E. Carey, Rochester, MN (US); Joseph W. Cropper, Austin, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/897,241

(22) Filed: Feb. 15, 2018

(65) Prior Publication Data
US 2018/0192275 A1 Jul. 5, 2018

Related U.S. Application Data

(63) Continuation of application No. 15/231,803, filed on Aug. 9, 2016, now Pat. No. 9,949,103.

(51) Int. Cl.
*H04W 4/90* (2018.01)
*G06F 17/27* (2006.01)
*H04L 12/58* (2006.01)
*H04W 4/02* (2018.01)

(52) U.S. Cl.
CPC ............ *H04W 4/90* (2018.02); *G06F 17/273* (2013.01); *G06F 17/274* (2013.01); *H04L 51/32* (2013.01); *H04W 4/025* (2013.01); *H04L 51/00* (2013.01)

(58) Field of Classification Search
CPC ..... G06F 17/273; G06F 17/274; H04L 51/00; H04L 51/32; H04W 4/025; H04W 4/90
USPC ...................................................... 455/404.2
See application file for complete search history.

(56) References Cited

U.S. PATENT DOCUMENTS

| 8,028,030 | B2 | 9/2011 | Edlund et al. |
|---|---|---|---|
| 8,098,939 | B2 | 1/2012 | Oliver |
| 8,903,719 | B1 | 12/2014 | Landry et al. |
| 9,747,275 | B1 | 8/2017 | Barsness et al. |
| 2006/0069728 | A1 | 3/2006 | McEvilly et al. |
| 2008/0172412 | A1 | 7/2008 | Gruhl et al. |

(Continued)

FOREIGN PATENT DOCUMENTS

CN 104333661 A 2/2015

OTHER PUBLICATIONS

Unknown, "Undo sending your mail", Gmail Help, Last Printed Apr. 12, 2016, 1 page.

(Continued)

*Primary Examiner* — Timothy X Pham
(74) *Attorney, Agent, or Firm* — Peter J. Edwards

(57) ABSTRACT

A processor may determine, using natural language processing, a writing style of content of a composed message written by a composer. The processor may analyze, using natural language processing, a set of previous message written by the composer. The processor may identify, based on the analyzing, writing habits of the composer. The processor may also identify a difference between the writing style of the content and the writing habits of the composer. The processor may display a notification of the difference to the user.

20 Claims, 4 Drawing Sheets

(56) References Cited

U.S. PATENT DOCUMENTS

| | | | |
|---|---|---|---|
| 2009/0157714 | A1 | 6/2009 | Stanton et al. |
| 2009/0241198 | A1 | 9/2009 | Takagi et al. |
| 2013/0047099 | A1 | 2/2013 | Markman et al. |
| 2013/0198862 | A1 | 8/2013 | Guo et al. |
| 2014/0181229 | A1 | 6/2014 | Tucker et al. |
| 2014/0189027 | A1 | 7/2014 | Zhang et al. |
| 2014/0257791 | A1 | 9/2014 | Nhiayi |
| 2016/0019402 | A1 | 1/2016 | Khandelwal |
| 2016/0294755 | A1 | 10/2016 | Prabhu |

OTHER PUBLICATIONS

Barsness et al., "Modification of Textual Messages", U.S. Appl. No. 15/196,329, filed Jun. 29, 2016.
Barsness et al., "Notification of Potentially Problematic Textual Messages", U.S. Appl. No. 15/231,803, filed Aug. 9, 2016.
U.S. Appl. No. 15/415,923, Accelerated Examination Support Document, Dated Jan. 24, 2017, 13 pages.
Barsness et al., "Notification of Potentially Problematic Textual Messages", U.S. Appl. No. 15/897,258, filed Feb. 15, 2018.
IBM, List of IBM Patents or Patent Applications Treated as Related, Feb. 14, 2018, 2 pages.

NOTIFICATION OF POTENTIALLY PROBLEMATIC TEXTUAL MESSAGES

BACKGROUND

The present disclosure relates to natural language processing, and more specifically, to natural language processing of textual communications.

The use of text-based communication systems (e.g., email messages, SMS messages, and social-media messaging systems) in the day-to-day lives of the population is increasing. Many users of text-based communication systems may have access to text-based communication capabilities for personal use, employment use, and others at all points throughout the day, every day of the week.

SUMMARY

Some embodiments of the present disclosure can be illustrated by a method for notifying a message composer of potential issues with the message. In the method a processor may determine, using natural language processing, a writing style of content of a composed message written by a composer. The processor may analyze, using natural language processing, a previous set of messages written by the composer. Based on the analyzing, the processor may identify writing habits of the composer. The processor may also identify a difference between the writing style of the content of the composed message and the writing habits of the composer. The processor may then display the difference to the composer.

Some embodiments of the present disclosure can also be illustrated by a system comprising a processor and a memory in communication with the processor, the memory containing program instructions that, when executed by the processor, are configured to cause the processor to perform a method for notifying a message composer of potential composer impairment. In the method a processor may determine, using natural language processing, a writing style of content of a composed message written by a composer. The processor may analyze, using natural language processing, a set of previous messages written by the composer. The processor may identify, based on the analyzing, writing habits of the composer. The processor may also identify a difference between the writing style of the content of the composed message and the writing habits of the composer. The processor may determine, based on the difference, that the composer was in an impaired state when composing the message. The processor may then notify the composer of the difference after a pre-determined wait time.

Some embodiments of the present disclosure can also be illustrated by a computer program product comprising a computer readable storage medium having program instructions embodied therewith, the program instructions executable by a computer to cause the computer to determine, using natural language processing, a writing style of content of a composed message written by a composer. The computer may determine, based on the content of the composed message, whether the message is intended to notify a recipient of an emergency situation. The computer may analyze, using natural language processing, a set of previous messages written by the composer. The computer may identify, based on the analysis, writing habits of the composer. The computer may then identify a difference between the writing style of the content and the writing habits of the composer. The computer may then determine, based on the determining is intended to notify a recipient of an emergency situation, whether to display, through a graphical user interface, a notification of the difference to the user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
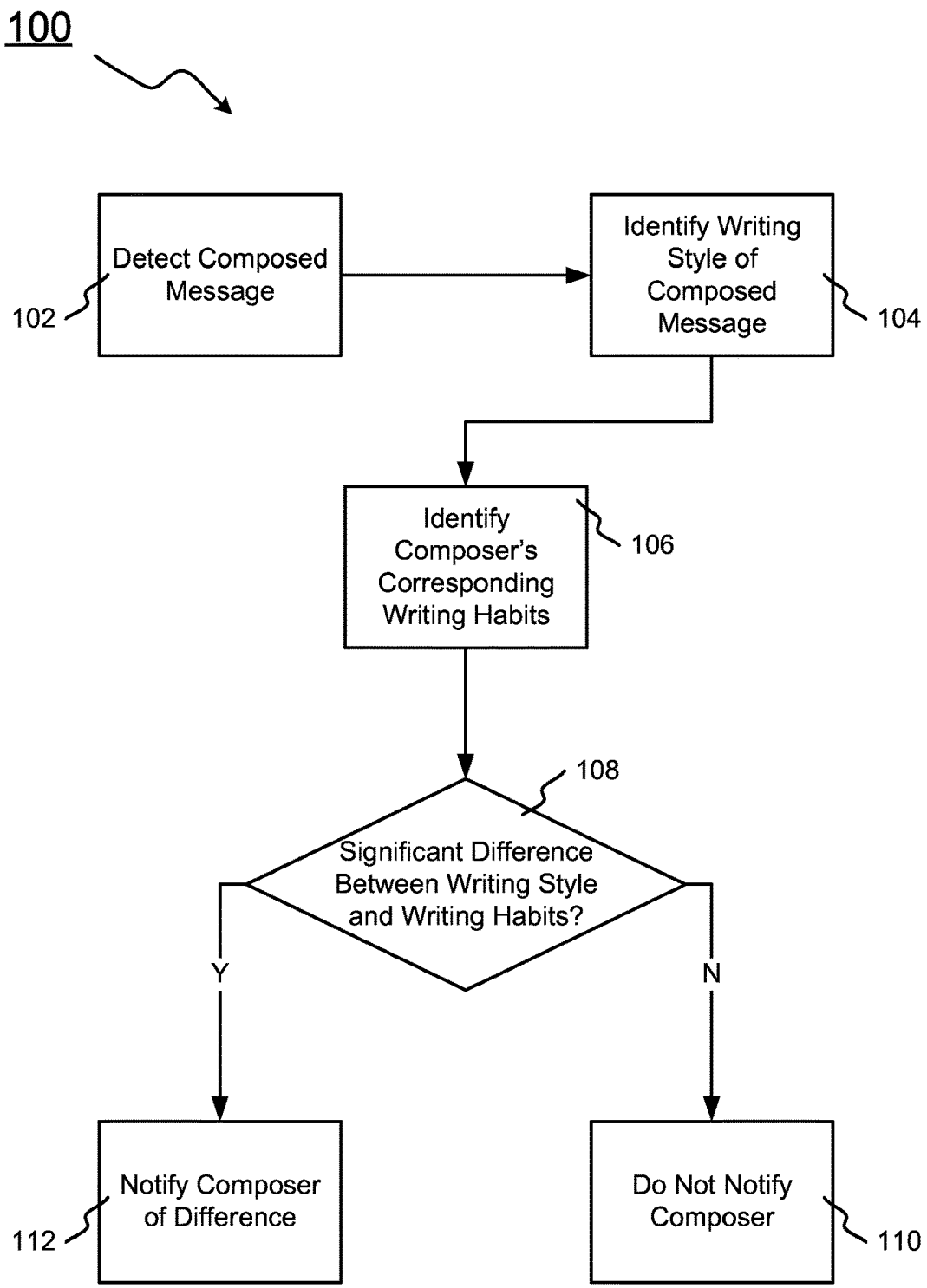
FIG. 1 depicts a method by which a composer may be notified of a difference between a composed message and the composer's corresponding writing habits, in accordance with embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to natural language processing, more particular aspects relate to Natural language processing of textual communications. While the present disclosure is not necessarily limited to such applications, various aspects of the disclosure may be appreciated through a discussion of various examples using this context.

As the percentage of the population with constant access to internet-connected devices (e.g., desktop and laptop computers, tablets, smartphones and other smart devices; also referred to as "personal devices") increases, text-based communication (e.g., email, short-message-service messaging (SMS), and instant messaging) becomes increasingly used over other forms of communication (e.g., voice communication over the phone). Further, users of these internet-connected devices are integrating more of their communication media (e.g., personal email, work email, social-media messaging, and stand-alone instant messaging applications) on their internet-connected devices. For many users, this provides a constant, 24-hours-per-day, 7-days-per-week access to all of their communication media. Some of these users may communicate differently over different types of these media (e.g., a user may communicate professionally over his or her work instant-messaging application, but informally over his or her personal instant-messaging application) or may communicate over some media at a time at which it may be inappropriate to communicate over another (e.g., it may be acceptable for a user to communicate over personal email, but not work email, when that user is emotionally unstable). However, with constant access to many of these communication media through the same internet-connected device, some users may accidentally communicate over one medium in a way that is only appropriate over a different medium. Further, some communication media contain error-correction functionality (e.g., autocorrect) that may incorrectly infer the content that a user is intending to include in a message, which could lead to inappropriate message content (e.g., changing an innocuous typo into a profane term). Such "corrections" may go unnoticed by the user, but some embodiments of the present disclosure may be used to detect and notify the user of the corrections before a message is sent.

Natural language processing (NLP) may be used to analyze several metrics of these text-based communications. For example, NLP may be used to rate the grammar of a composed email (e.g., whether multiple grammar mistakes are present in the email), or to determine whether an SMS message is written in an angry tone (e.g., whether harsh or accusing words are used). Communication systems may also utilize natural language generation (NLG) to generate suggested alternative message content or automatically modify a message when NLP analysis identifies a potential issue with the message content (e.g., poor grammar).

Some personal devices may also be equipped with the ability to record some of the user's usage patterns. For example, some personal devices may be able to record the accuracy with which a user is able to provide input into the personal device. Other personal devices may be able to track the movement of the device while it is being held by the user.

Some embodiments of the present disclosure may improve upon communication systems by, for example, determining whether the writing style used in a composed message differs significantly from the composer's writing habits for a typical message sent over that particular communication medium or to that particular class of recipient. Further, some embodiments may determine, based on the user's usage patterns of a personal device, whether the user may be in an impaired state, such that it may be inappropriate for the user to communicate over certain communication media.

FIG. 1 depicts a method 100 by which a communication system may notify a message composer of a deviation from that composer's writing habits. In block 102, a composed message is detected. In some embodiments this detection may occur while a composer is in the process of composing the message. In other embodiments the detection may occur once a message is saved (e.g., as a draft message). In other embodiments the detection may occur in response to a composer command (e.g., a composer may click a button in his or her email software requesting the software to perform NLP on the message). In yet other embodiments, the detection may occur once the composer has chosen to send the message. In such embodiments the detection may intercept the message to perform NLP before it is transmitted.

Once the composed message is detected, a writing style of the composed message is identified using natural language processing in block 104. In some embodiments, for example, the communication system may be configured to perform semantic and syntactic analysis on the composed message. In some embodiments the communication system may determine whether the composer used proper grammar throughout the message, and may calculate a "grammar score" for the content. In other embodiments the system may analyze the word usage of the message and calculate a vocabulary level for the content. Some embodiments may detect regional or cultural slang, or other vernacularisms (e.g., common industry words and personal word choice). Other embodiments may determine a sentiment of the message (e.g., by detecting harsh or profane words, type of punctuation used, and the presence of "small talk" in an otherwise professional message). Yet other embodiments may determine a professionalism level of the content (e.g., detecting whether a standard greeting and a standard closing are used and detecting colloquial language). Further possibilities are possible, some of which are discussed below; the embodiments of this disclosure are not intended to be limited to any particular type of NLP or indication of writing style.

In block 106 the writing habits of the composer are analyzed. For example, natural-language-processing methods similar to those used in block 104 may be utilized to analyze past messages that were sent by the composer. In some embodiments any or all available past messages that sent were sent by the composer may be analyzed to identify the composer's average writing style. In other embodiments only messages that fall into a certain category may be analyzed (e.g., meta data tags may be attached to each message to specify the categories into which those messages are classified). For example, each message may be classified into a category based on the recipient or recipients of the message (e.g., the message may be associated with a metadata tag that specifies, for example, "to: [Recipient A]" or "to: [Recipient B and C]. In these embodiments, if the recipient or recipients of the composed message are determined, only past messages that are classified into the one of the same recipient categories as the composed message (i.e., have at least one recipient in common with the composed message) may be analyzed. For example, if the composed message is an instant-messaging message to the composer's employer, all messages classified into a "to:[Employer name]" category may be analyzed to determine the writing habits the composer typically utilizes when drafting messages to his or her employer. In some such embodiments analysis may be performed on any previous message that shares at least one recipient category with the composed message (e.g., analysis on a previous message to recipients A, B, and C may be performed even though the composed message is only sent to recipients B and C). In other embodiments only previous messages with the exact same category information may be analyzed (e.g., analysis would only be performed on previous messages to recipients B and C if the composed message were only sent to recipients B and C).

In yet other embodiments the recipient or recipient of the composed message may be classified into a recipient-type category, in which case only past messages sent to recipients in that recipient-type category may be analyzed. For example, if the composed message is an email sent from the composer's work email address, any email written to a recipient with an email address exhibiting a different domain name may be a client or prospective client of the composer. Any such recipient may be placed in an "outside organization" recipient-type category, in which case only past messages sent to recipients with email addresses exhibiting a domain name different than that of the composer's may be analyzed. In similar embodiments a communication system may have access to the composer's address-book information, and may utilize that information to assign recipients to recipient-type categories. For example, a composer may list a message recipient as his or her brother-in-law in his address book, in which case the communication system may categorize that recipient to a "family" recipient-type category. In this example only past messages written to other recipients in the "family" category may be analyzed to determine the composer's writing habits.

In some embodiments social-media information may also be used to determine the recipient-type category of a composed-message recipient. The communication system may look up the recipient on social-media services by, for example, email or name. For example, a composer may have a recipient of a composed message listed as his or her coworker or his or her father on his or her social media profile. The communication system may then determine that the recipient is in the "coworker" recipient-type category or the "family" recipient-type category respectively. In some embodiments the content of previous messages, social media or otherwise, may be available, in which case information from the messages may be used to derive recipient-type categories. For example, a composer may regularly send messages to a recipient with the same last name (e.g., as part of an email name, address-book entry, or social-media profile name) as the composer, and refer to that person as "bro" or "sweetheart" in the messages. In those cases the communication system may infer that the recipient is in the "family" recipient-type category.

In some embodiments the past messages to be analyzed may be chosen based on the communication medium being used to compose or send the composed message. For example, if the composer is sending a message using his or her work email address, only messages sent from the composer's work email address may be analyzed. In some such embodiments the communication medium may be assigned to a communication-medium category, and only previous messages from the same communication-medium category as the composed message may be analyzed. For example, a social-media messaging system may be assigned to a "personal" or "informal" communication-medium category. Only messages from that category (e.g., social-media messages, SMS messages, and personal email messages) may be analyzed when determining the writing habits corresponding to the writing style of a composed social-media message.

In some embodiments multiple factors may be considered together when determining the messages from which to identify the composer's writing habits. For example, if a composed message is addressed to a composer's brother (which may be determined, for example, by the information in the composer's address book or by the words "Hey bro," in the message greeting), it may be beneficial to analyze previous messages in the "family" recipient-type category but also messages in the "personal" communication-medium category. In some embodiments multiple factors may have opposing implications. For example, a composer may write a composed message to a recipient in the "college friends" group (e.g., as entered in the composer's address book), but do so from the composer's work email. In some such embodiments, all messages in the "college friends" recipient-type category (i.e., to the composer's college friends) may be considered in addition to all messages in the "sent from: work email" communication medium category (i.e., messages sent from the composer's work email) to identify writing habits that may be appropriate both for the recipient and the communication medium.

In other embodiments more complicated determination processes may be followed. For example, if the composer just started a new job at a company at which one of his "college friends" also works, the composer may have significantly more messages in the "college friends" recipient-type category than messages sent from the composer's work email. Thus, adding all messages in the "college friends" recipient-type category with all messages in the "sent from: work email" communication-medium category may result in identifying writing habits that are not appropriate for the communication medium. In this embodiment, the communication system may count the amount of messages in the smaller category (here, "sent from: work email") and select only that number of messages from the larger category (here, the "college friends" recipient-type). Thus, the composer's writing habits may be identified by analyzing all 50 of the emails the composer has sent from his or her work email as well as 50 of the messages that have been sent to any recipients in the "college friends" recipient-type category, even though there may be several thousand messages in that recipient-type category.

In similar embodiments, all messages from all applicable categories may be analyzed to identify the composer's writing habits, but effect of the results of the analysis of each category may be equalized or partially equalized before being combined. For example, the composed message may be a social-media message to the composer's coworker, and the writing habit being identified may be the grammar level of the previous messages. The communication system may analyze all previous messages in the "personal" communication-medium category, as well as all previous messages in the "coworker" recipient-type category, and develop grammar scores for the messages in each category (e.g., rating the grammar between 0 and 100, 0 being unreadable and 100 being flawless). The two grammar scores may then be added together and averaged (e.g., the grammar score for the "coworker" recipient-type category may be 80 and the grammar score for the "personal" communication-medium category may be 20, resulting in an average of 50). In this example, even if there are several thousand previous "social-media" messages and only a few previous "coworker" messages, both categories may be equally weighted.

In yet further embodiments, each category may further limit the others. For example, the writing habits corresponding to a composed message to which multiple categories may apply may be identified by analyzing only those previous messages to which all those categories apply. For example, if the composed message is an SMS message sent to the composer's mother, only messages in both the "personal" communication-medium category (or, in related embodiments, the "SMS" communication-medium category) and the "family" recipient-type category (or, in related embodiments, in the "sent to: mother" recipient category) may be analyzed to identify the composer's writing habits.

Upon identifying the composer's corresponding writing habits in block 106, the communication system determines in block 108 whether there is a significant difference between the writing style of the composed message and the writing habits of the pervious messages. In some instances a significant difference may exist if, for example, the writing style of the composed message has a professionalism score of 10/100 (e.g., very informal language, slang, or profanity is used) and the writing habits have a professionalism score of 80/100 (e.g., formal language is used, no slang or profanity is present, and a formal greeting and closing with a signature block are present). In some embodiments whether this difference is significant may be determined by comparing the difference with a significance threshold. For example, the difference in the earlier professionalism-score example is 70/100. If the significance threshold were 50/100, the difference would be above the threshold.

In some embodiments the aspects of writing style and writing habits may be difficult to quantify, and thus whether a significant difference exists may be determined differently. For example, in some embodiments the difference in writing habits and writing style may relate to the amount of slang terms used in the message. In some embodiments slang terms may be identified by cross referencing the terms used in the composed message to a database of textual sources (e.g., a corpus) with information on the formality of each source (e.g., a database with metadata on each source, such as whether the source is from a peer-reviewed journal, a government notice, a sensational tabloid, or a popular-culture periodical, or whether the source is characterized as "extremely formal," "extremely informal," or an intermediate characterization). If a term used in the composed message is found predominantly only in extremely informal textual sources characterized, for example, as extremely informal or popular-culture periodicals, the term may be considered popular slang. A significant difference may exist if the writing habits are identified with a high professionalism score, but a term identified in the composed message is found only in extremely informal sources. In other embodiments a higher number of terms (e.g., a higher threshold of very informal terms) may be required before a significant difference is found.

In some embodiments the magnitude of the difference (e.g., the threshold-grammar-score difference, the number of slang words used) may be set by the composer's communication system preferences. In other embodiments, any difference may be determined to be significant. In other embodiments the significance of the difference may be weighted by other factors. For example, in some embodiments the communication system may be configured to detect whether a word is replaced by a feature of communication system or the device on which the composed message is composed that identifies and replaces misspelled words (e.g., autocorrect). In these embodiments a suspected word (or word in a suspected phrase) may be identified by the communication system that is slightly different than the composer's identified writing habits, but the overall difference for the composed message may not have been identified as significant. However, if that suspected word was automatically replaced (e.g., by an autocorrect feature), the communication system may conclude that the composer probably did not intend to use that word, and notify the user of the replacement. In some similar embodiments the presence of a suspected word that was automatically replaced may multiply the identified difference between the writing style and writing habits by a multiplier factor. In some embodiments, the value of this multiplier factor may be based on the number of suspected words automatically replaced (e.g., if 5% of the words in the message content contribute to a difference in writing style and writing habits and were automatically replaced, the multiplier factor may be 1.2, but if over 20% of the words contribute to the difference and were automatically replaced, the multiplier factor may be 10.0).

If a significant difference not found in block 108, the communication system does not notify the composer in block 110. However, if a significant difference is found, the communication system notifies the composer in block 112. In some embodiments this notification may list the specific ways in which the identified writing style and identified writing habits were found to be significantly different. In some embodiments this may list the terms, phrases, or other components that were found to differ from the identified writing habits. In other embodiments the notification may only bring the presence of a difference to the composer's attention at which point the composer may review the composed message to determine if modifications are necessary. In some embodiments the notification may be through a graphical user interface, such as a graphical user interface on the device that the composer used to write the composed message.

In some embodiments the notification in block 112 may suggest modifications to the composer that would reduce or eliminate the difference between the writing style of the composed message and the writing habits of the corresponding previous messages. For example, in the case that the identified writing habits of previous messages are very professional and the composed message is written informally, a formal greeting and closing may be suggested, and contractions may be replaced with their spelled-out alternatives. If the identified writing habits of previous messages use flawless grammar but the composed message contains several grammar mistakes, corrections to the grammar mistakes may be suggested using rules of grammar to which the natural-language-processing system may have access. If the writing habits of the corresponding composed messages exhibit, on average, very simple words, the communication system may identify esoteric words in the composed message and suggest commonly known words with similar meanings.

For example, the natural-language-processing system may have information related to the frequency of use of the words in a composed message. For example, the NLP system may have access to a collection of contemporary texts (e.g., a corpus), from which, in some embodiments, the frequency of use of any word used in the text may be calculated based on the number of uses in the collection. The NLP system may determine a frequency of use of each word used in the composed message. If the frequency of use of any word falls below a pre-determined threshold, the NLP system may determine a list of substitute words based on, for example, the dictionary definitions of the word, thesaurus data on the word, semantic analysis of how the word is used in the composed message, and others. The NLP system may then determine the frequency of use of each substitute, and suggest a substitute word with a higher frequency of use than the esoteric word.

In some embodiments the NLP system may have access to a database of infrequently used or esoteric words and commonly known replacements for those words. For example, the NLP system may scan the content of a composed message for any words present in an "esoteric words" table. If a word from the table is found, the system may then search a "substitute words" table for a set of substitute words. The system may choose a substitute based on, for example, a determination of which word may best fit in with the surrounding content of the message (e.g., by performing semantic analysis on the surrounding clauses, by matching the number of syllables in the substitute with the average number of syllables in the surrounding words), a determination of which word is most likely to be preferred by the composer (e.g., by scanning the composer's previous messages to locate a substitute word used by the composer), or by eliminating substitute words that are already present in the content of the composed message.

Figure 2:
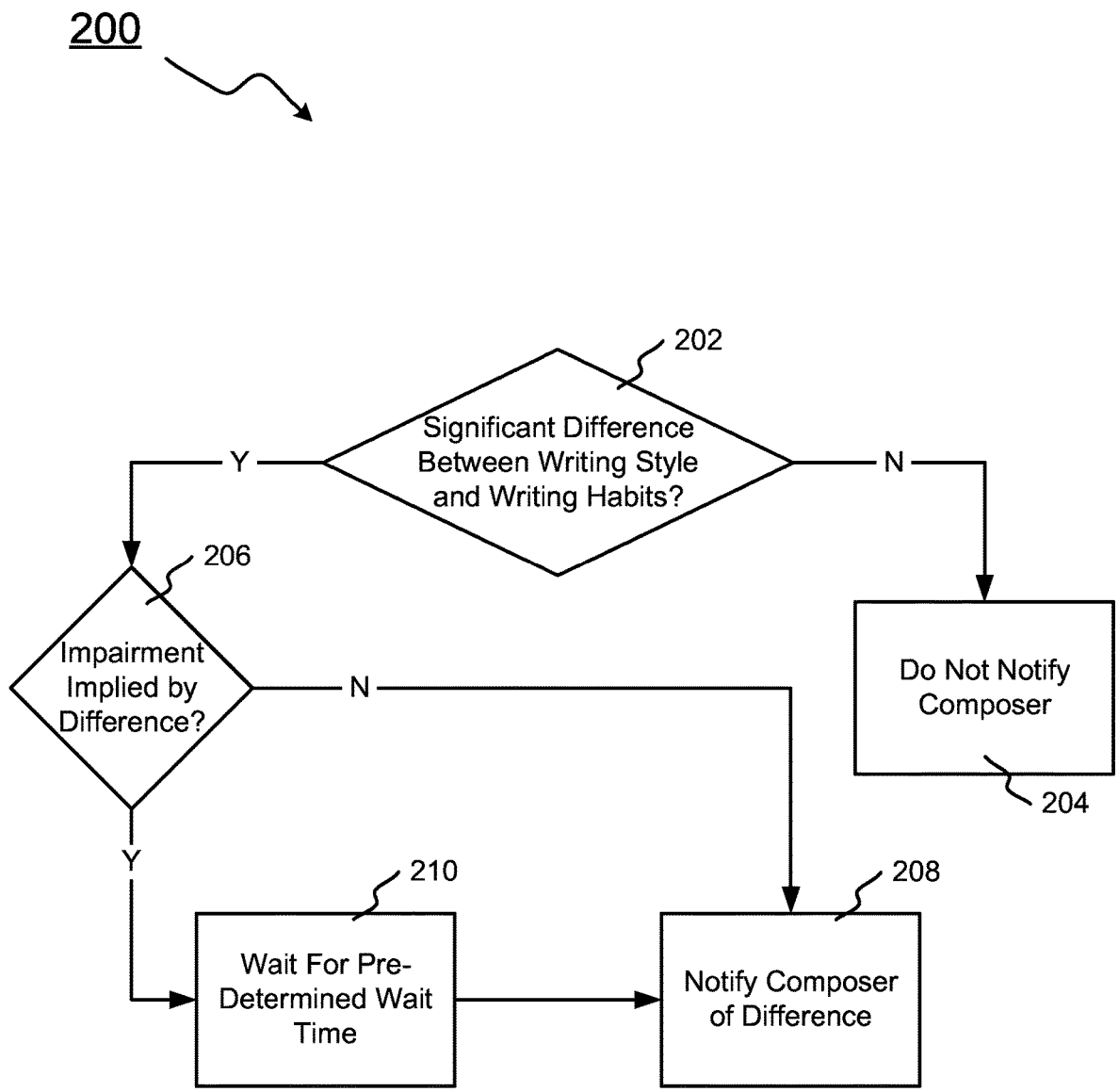
FIG. 2 depicts a method by which a composer may be notified, after a pre-determined wait time, of a difference in a composed message that may imply user impairment, in accordance with embodiments.

In some embodiments the communication system may be configured to detect impairment on the part of the composer, and delay a notification of a significant difference between the writing style of the composed message and the composer's writing habits. Method 200, illustrated in FIG. 2, is an example of such an embodiment. In block 202, the communication system determines whether there exists a significant difference between the writing style of a composed message and the writing habits of the composer. In some embodiments this determination may utilize similar information as the determination in block 108 of FIG. 1, and thus the previous messages from which writing habits are identified may also be limited similarly. However, in some embodiments it may be beneficial to utilize all previous messages written by the composer to identify the composer's writing habits. In some embodiments the determination may include considerations that are particularly relevant to whether the composer is impaired.

Impairment may be any mental state that may be detected by the communication system and may negatively impair the decision-making capabilities of the composer. Examples of impairment include fatigue, stress, emotional instability, or a reaction to medication. Thus, whether a difference implies impairment may depend on whether a difference suggests that the composer was not in such a mental state when writing the previous message or messages, but was in such a state when writing the composed message. For example, a composer may make a far higher amount of typographical errors (e.g., spelling mistakes, letters missing or out of order, duplicated letters or other characters, and missing spaces) when fatigued than when alert. Thus, a communication system may compare the words used in a composed message and the words used in one or more previous messages to dictionary data to determine the percentage of typographical errors (e.g., by dividing the number of words or characters exhibiting a typographical character by the total number of words or characters in the message) in each. Such impairments may also be identified based on the number or percentage of words in the composed message that are unrecognizable in an NLP analysis (e.g., words for which the communication system is unable to find a close substitute in a database of words). If, on the other hand, the composer is experiencing a reaction to medication, (e.g., the composer is recovering from surgery and has been given pain medications by the composer's medical provider), the composer may be writing incoherently (e.g., incomplete sentences, unrelated clauses in close proximity, and words used in ways contrary to the definitions of those words). A natural-language-processing semantic analysis of the composed message, compared to a similar analysis of at least one previous message, may show that the composed message is significantly less coherent than the previous message or messages. A "coherence score" may be calculated for each. The two coherence scores may be compared to determine the difference. Similarly, if a composer is very stressed or emotionally unstable, the composed message may exhibit negative sentiment (e.g., harsh, profane, or dismissive language, accusations, and "yelling,"). These sentiments may be identified based on, for example, sentiment analysis, parsing, semantic analysis, and logical analysis.

Whether a difference is significant may also be determined similarly to block 108 of FIG. 1. For example, a composer may establish preferences in his or her communication system that set a threshold value (e.g., a percentage difference) that must be found before a difference is found to be significant. If difference of the "coherence scores," for example, of the composed message and the writing habits is above this set threshold, the difference is significant. If a significant difference is not identified in block 202, the communication system does not notify the composer in block 204. In some embodiments this may also involve sending the message. For example, the composer's communication system may include a means by which the composer may instruct the communication system to perform an analysis of the composed message and send the message if no significant difference exists between the writing style and writing habits (e.g., a "check and send" button).

However, if a significant difference is identified, the communication then determines in block 206 whether the difference implies some type of impairment on the part of the composer at the time of the writing of the composed message. A difference may imply composer impairment if, as discussed above, the composed message exhibits higher typographical errors, is less coherent, or exhibits a more negative sentiment than the composer's writing habits. However, in certain instances other differences may also imply impairment. For example, a lack of clear thinking may be implied by a difference in the professionalism of writing style and writing habits if NLP analysis of the composed message identifies a lack of inhibition in the content of the composed message. This may be identified, for example, by sentiment analysis, parsing, and the definitions of words used in the composed message. A low grammar score in a composed message may imply composer impairment if the composer has a habit of using proper grammar even in casual previous messages (e.g., if a composed message, written to the composer's employer, is written with a lower grammar score than previous messages written to close friends on social media).

If the communication system determines in block 206 that an impairment is not implied by the difference, the composer is notified of the difference in block 208. However, if the communication system determines that an impairment is implied by the difference, the communication system waits for a pre-determined wait time in block 210 before notifying the composer of the difference. This may be beneficial in instances in which the impairment that resulted in the difference would also impede the composer's ability to make a decision regarding the difference. In some embodiments the amount of this wait time may be established by the configurations of the composer's communication system. Different impairments may require different amounts of wait time, and thus in some embodiments the amount of the wait time may depend on the impairment that was implied in block 206. For example, if it is determined that the composer is likely overstressed or emotionally unstable (e.g., angry due to traffic on the way to the office), the communication system may wait four hours, at the end of which time the composer may have recovered from his or her stress or emotional instability. If the composer is likely overtired, the communication system may wait two hours, after which time the composer may have taken a nap or consumed a caffeinated beverage. These times may be set or adjusted by the composer in his or her communication-system configurations. After the pre-determined wait time has passed, the communication system notifies the composer of the difference in block 208. In some embodiments this notification includes modification suggestions, which include similar natural language generation as discussed in connection with block 112 of FIG. 1.

For example, if the NLP comparison of the composed-message writing style and the composer's writing habits identifies that the composed message is far longer and repetitious than normal, semantic and syntactic analysis may be performed on the composed message content to identify for removal repeated statements or ideas. If the composed message is far harsher than normal, the definitions of words used in the composed message content may be searched and substitutes identified for words with negative connotations. If the composed message lacks rapport-building language that is found, on average, in the composer's writing habits, inclusion of small talk may be suggested (e.g., a comment about the weather or a "how are you" question).

In some embodiments composer impairment may be identified by indications other than or in addition to differences in a composed message's writing style and the writing habits of the composer. This may be beneficial, for example, in instances in which the impairment does not cause a difference that is detected by natural language processing, but still results in a message that is undesired (e.g., a composer may ask a colleague who has recently been undergoing family issues "how is the family?" if the composer, due to an impaired state, does not remember being told of the family issues). For example, the communication system may have access to usage information of a personal device of the composer, which may be compared to the composer's previous usage information for that device.

Figure 3:
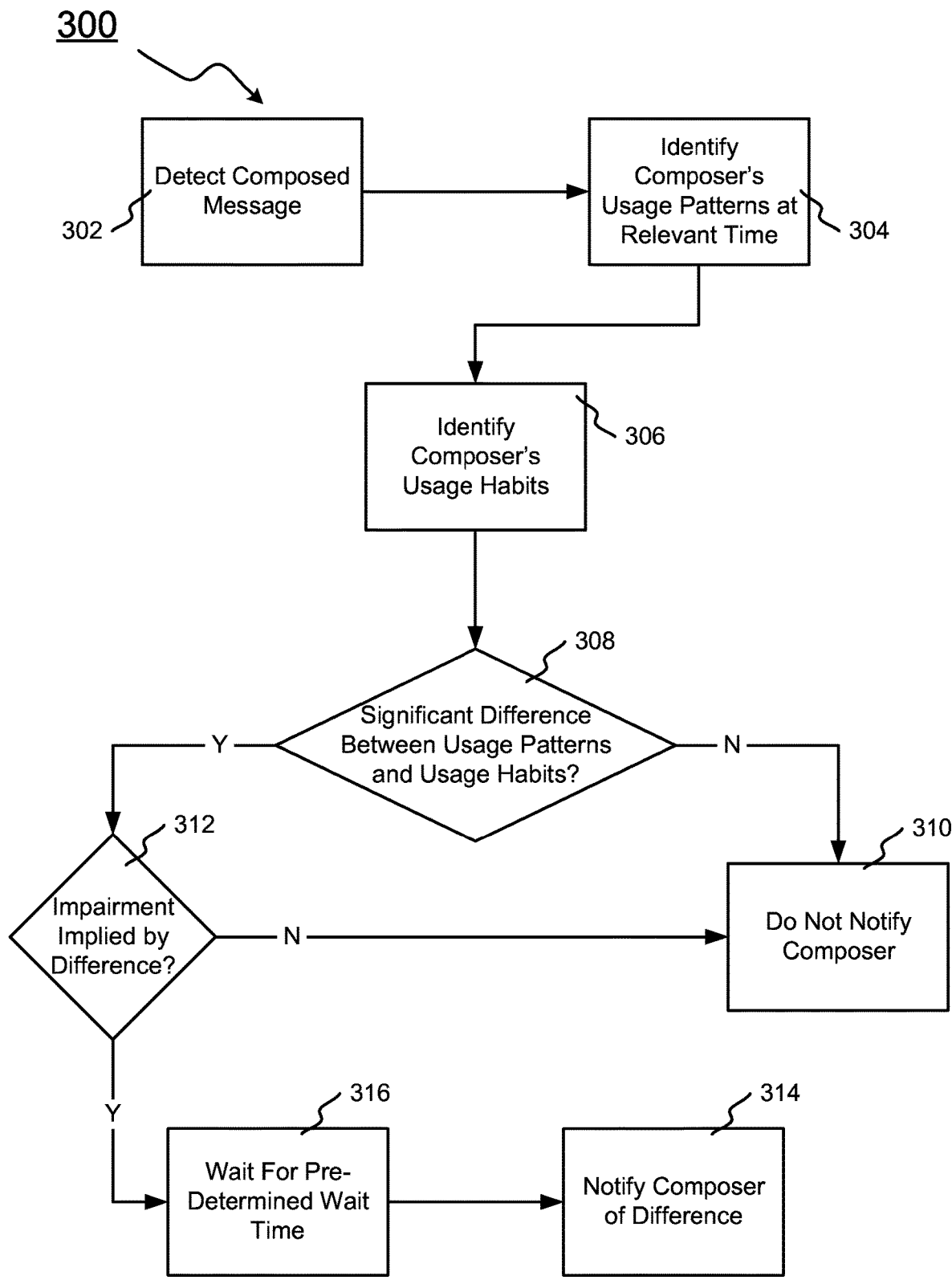
FIG. 3 depicts a method by which a composer may be notified, after a pre-determined wait time, of a difference in usage patterns that may imply user impairment, in accordance with embodiments.

Such an example is illustrated by method 300 in FIG. 3. In block 302, a composed message is detected. This detection may occur, for example, during the composition of the message, when the message is saved (e.g., as a draft), or once the composer has attempted to send the message (e.g., by pressing a "send" button in the composer's communication system). Upon detecting the message, the communication system identifies the composer's usage patterns during the relative time for one of the composer's personal devices in block 304. The timeframe during which the usage patterns may be relevant may depend on several circumstances. For example, in many instances a message may be composed and sent in close proximity, in which case the usage patterns at the time of the message composition or the time of the attempted sending of the message may be sufficient to identify the relevant usage patterns. In other instances, a time delay may exist between the composition of the message and the attempted sending of the message.

For example, a composer may, in an impaired state, compose a message when the composer's communication system is unable to send a message (e.g., the communication system may not have internet access or cellular signal). However, the communication system may automatically attempt to send the message as soon as it has the ability to. In this example, the usage patterns at the time of the message composition may be most relevant, and the usage patterns at the time the message is sent may be less relevant or irrelevant. In other examples, a composer may write a composed message when the composer is not impaired, and due to a lack of impairment realizes the composed message should not be sent, and thus saves it to be edited and sent at a later time. If the composer then revisits the composed message while impaired, the composer may change his or her mind without due consideration and send the message as is. In this example, the usage patterns at the time of message consumption may not be relevant, but the usage patterns at the time of the send attempt may be very relevant.

Usage patterns may involve, for example, motion patterns of a personal device, how often the composer deletes content while writing the composed message (e.g., if the composer is not planning the message content effectively), how often a composer relies on suggested changes to content (e.g., autocorrect suggestions of spelling errors or autocomplete suggestions of incomplete words), and the number of attempts it takes a composer to complete an interaction with the personal device (e.g., if the composer is missing an icon on the touchscreen of a tablet or smartphone, imprecisely navigating with the mouse cursor on a computer, or losing track of the task at hand and navigating to and exiting out of several applications in a short period of time) at the relevant time. For example, the composer may use a smartphone with motion-tracking capabilities, in which case the communication system may identify the motion patterns of the smartphone. In some instances the composed message may exhibit impeccable spelling and grammar, but the composer may have made several mistakes that required deleting or replacing during the composition. This may be detected if the communication system has access to the composer's keystroke history or composition choices (e.g., the communication system may detect the composer repeatedly pressing a "delete" or "backspace" button during message composition or by relying heavily on an "autocorrect" function). In some embodiments this personal device may be the device on which the composed message is written, but in other embodiments the composed message may be written on a different device.

Some usage patterns may be relevant for particular participants of categories of participants. For example, a composer may send messages to his or her coworkers only during his or her workday (e.g., Monday through Friday from 8 AM until 5 PM). The time at which this composer composes or sends a message to his or her coworkers may then be relevant usage patterns (e.g., if the composer suddenly writes and sends a composed message to a coworker at 2 AM on Saturday morning, it may be an indicator of impaired judgment).

Once the composer's usage patterns for the relevant time (e.g., during message composition, at message send time, or both) are identified, the composer's corresponding usage habits may be identified in block 306. The communication system may analyze one or more sets of usage patterns for any period of time outside the relevant time during which the composer's usage patterns were determined in block 304. For example, if the composed message was written several days prior to being sent (e.g., if the communication system did not have access to the internet when the message was composed), the composer's usage before and after the day on which the message was composed may be analyzed. If, however, the message was composed and sent at approximately the same time, the composer's usage before the composition (e.g., for one week before the day on which the consumption occurred) may be analyzed. The analysis of these usage patterns may be used to identify the composer's usage habits.

Once the composer's usage habits are identified in block 306, the communication system determines in block 308 whether there is a significant difference between the composer's set of usage patterns at the relevant time and the composer's identified usage habits. In some embodiments, this may involve identifying a behavior and determining how often that behavior occurs in the set of usage patterns and the usage habits. For example, the act of changing the acceleration of a phone (e.g., as an overly tired composer or a medicated composer attempts to hold the phone or his or her body steady) above a certain threshold (e.g., above 0.2 $m/s^2$) may be tracked by the communication system, which may then determine the number of times the behavior occurred each minute during the relevant time and in the composer's usage habits. The behavior may also be hitting the "delete" or "backspace" key a threshold number of times in a row (e.g., 1), which the communication system may track per period of time (e.g., per minute) or per unit of text (e.g., per word, per sentence, and per message). The behavior may also be accepting a personal device's suggestion of a substitute word for a word that the composer has misspelled (e.g., accepting a laptop computer's autocorrect suggestion). The communication system may thus track, for example, how many times the composer accepted an autocorrect suggestion while composing the composed message, and how many times the composer accepts an autocorrect suggestion per message in the composer's identified usage habits.

If a significant difference is not identified between the composer's identified set of usage patterns during the relevant time and the composer's identified usage habits, the communication system does not notify the composer in block 310. In some embodiments this may include sending the composed message, saving the composed message as a draft, or taking no action with respect to the composed message and awaiting further instruction from the composer.

If, however, a significant difference is identified in block 308, the communication system determines in block 312 whether an impairment is implied by the difference. In some embodiments this may be impacted by the type of usage in which a difference was identified. For example, a significant difference may be identified between the number of times a composer relies on a communication system's suggestion of a word or phrase as the composer is typing the word or phrase (e.g., autocomplete functionality). However, the use of autocomplete functionality may not be correlated with composer impairment in the absence of errors typing the word or phrase, and thus the difference in the behavior would not imply composer impairment. If the difference does not imply composer impairment, the communication system proceeds to block 310.

However, the use of a substitution-suggestion functionality for misspelled words or other typographical errors may be correlated with composer impairment. Thus, a significantly higher incidence of accepting suggested substitutions while typing the composed message than the incidence shown in the usage habits may imply composer impairment while typing the composed message. If composer impairment is implied by the difference, the communication system waits for a pre-determined wait time in block 316. The amount of the pre-determined wait time may vary based on the type difference identified in block 308 (e.g., spelling errors, repeated words or repeated letters), the magnitude of the difference identified in block 308 (e.g., the value of the difference of the grammar scores), and other factors. The amount of the pre-determined wait time may also be set or altered by settings in the composer's communication system. In some embodiments, the composer may cancel the pre-determined wait time by, for example, accessing the composed message in the composer's outbox during the pre-determined wait time and instructing the communication system to send the message in spite of the pre-determined wait time.

After the pre-determined wait time has expired, the communication system notifies the composer in block 314 of the difference identified in block 308. In some embodiments this may include only a generic notification that informs a composer that an impairment was implied during the relevant time, but give no further information. In other embodiments the composer may be informed of the usage difference or differences that were identified in the analysis, and the magnitude of those differences. In some embodiments the communication system may also inform the composer the type of impairment that was implied. If any differences between the composer's writing habits and the composed message writing style are also identified, the composer may also, as part of block 314, be presented with suggestions for changes to the composed message to eliminate the differences. These differences may be identified using natural-language-processing analysis and the suggested changes may be identified using natural language generation.

Some embodiments of the present disclosure may interrupt the sending of a composed message to notify a composer of an aspect of the message (e.g., of differences between a composed message writing style and the composer's writing habits, or of potential user impairment). Some such embodiments may not notify the composer until after a pre-determined wait time. However, in instances in which a composed message meant to notify a recipient of an emergency situation, interrupting the sending of a message may be undesirable. Thus, in some embodiments, the communication system may employ natural-language processing to determine whether a message is likely to be sent due to an emergency situation, in which case the notification or wait-time functions may be bypassed. For example, the communication system may scan the composed message content for emergency-indicating keywords, such as "help," 'police," or "emergency." In these instances, the composed message may be sent upon the composer issuing a "send" command, regardless of stylistic differences or differences that may imply composer impairment.

In some embodiments external sources may be used in addition to or in place of natural-language processing to determine whether a message is likely to be sent due to an emergency situation. For example, a composer's location at the time a composed message is sent (which may be available, for example, from the GPS capabilities of a personal device belonging to the composer) may be cross referenced against publicly available reports of current emergencies (e.g., police reports, postings on news websites, locations of traffic accidents). In some such embodiments, the communication system may determine to send the message without any processing if the composer's location is significantly close to a reported emergency (e.g., within 100 feet of a traffic accident). In other embodiments, the communication system may also analyze the composed message using natural-language processing to determine if the composed message content is relevant to the emergency. In some such embodiments, the composed message may be interrupted (e.g., if a significant difference between writing style and writing habits is identified) if the composed message content appears to have nothing to do with an emergency (e.g., if no emergency-indicating keywords are identified in the composed message).

Figure 4:
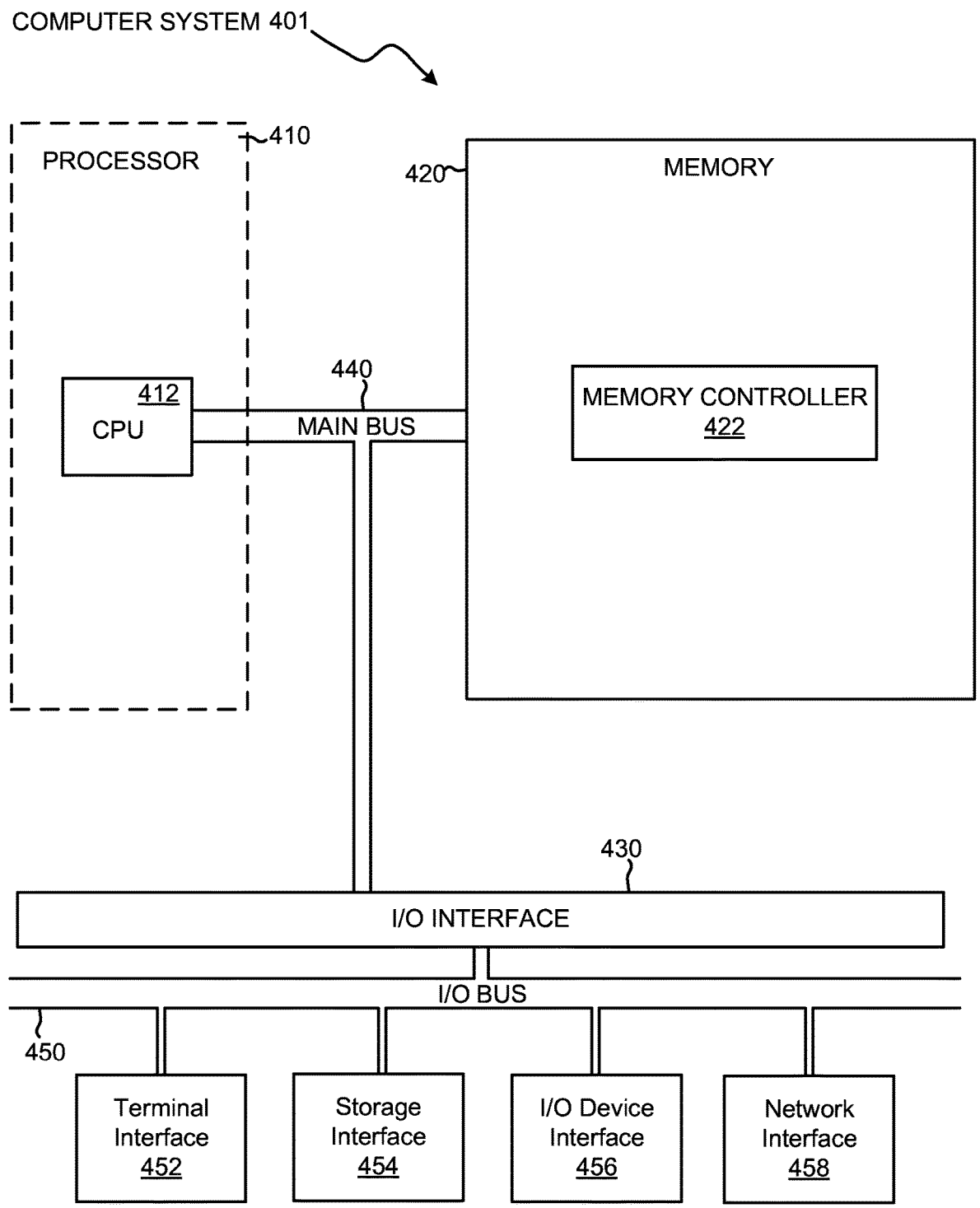
FIG. 4 depicts the representative major components of a computer system that may be used in accordance with embodiments.

In further embodiments sources such as social media may be utilized in addition to or in place of one or both of natural-language processing and publicly-available reports. In some embodiments the composer's city of residence may be known, in which case the communication system may scan social-media sources to identify posts about emergencies in that city. For example, natural emergencies such as earthquakes or tornadoes may be identified by scanning popular social media topics for terms such as "earthquake," "ground shook," tornado," "funnel cloud," etc. In embodiments in which a potential emergency situation is identified using social-media sources, a message may be sent before being processed, and thus may not be interrupted. In other embodiments, the communication system may also analyze the composed message using natural-language processing to determine if the composed message content is relevant to the emergency. In some such embodiments, the composed message may be interrupted (e.g., if a significant difference between writing style and writing habits is identified) if the composed message content appears to have nothing to do with an emergency (e.g., if no emergency-indicating keywords are identified in the composed message). FIG. 4 depicts the representative major components of an exemplary Computer System 401 that may be used in accordance with embodiments of the present disclosure. The particular components depicted are presented for the purpose of example only and are not necessarily the only such variations. The Computer System 401 may comprise a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may be comprised of one or more CPUs 412. The Processor 410 may additionally be comprised of one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may be comprised of one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may be comprised of a Memory Controller 422 and one or more memory modules for temporarily or permanently storing data (not depicted). In some embodiments, the Memory 420 may comprise a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may comprise an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may comprise the Terminal Interface 452, the Storage Interface 454, the I/O Device Interface 456, and the Network Interface 458. In some embodiments, the various interfaces may comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
a processor; and
a memory in communication with the processor, the memory containing program instructions that, when executed by the processor, are configured to cause the processor to perform a method, the method comprising:
determining, by a processor and using natural language processing, a writing style of content of a composed message written by a composer;
analyzing, by the processor and using natural language processing, a set of previous messages written by the composer;
identifying, by the processor and based on the analyzing, writing habits of the composer;
identifying, by the processor, a difference between the writing style of the content and the writing habits of the composer; and
displaying, by the processor and through a graphical user interface, a notification of the difference to the composer.

2. The system of claim 1, wherein the method further comprises:
classifying the composed message into a category; and
wherein the set of previous messages is limited to messages that share the category with the composed message.

3. The system of claim 2, wherein the category is chosen based on social-media information.

4. The system of claim 2, wherein the category is a recipient category.

5. The system of claim 2, wherein the category is a recipient-type category.

6. The system of claim 2, wherein the category is a communication-medium category.

7. The system of claim 1, wherein the method further comprises weighting the value of the identified difference based on whether a word that contributed to the difference was automatically replaced during message composition.

8. The system of claim 1, wherein the natural language processing comprises cross referencing terms with a database of contextual sources.

9. The system of claim 1, wherein displaying a notification of the difference comprises suggesting a content modification to the composer, wherein the modification would reduce the difference.

10. A computer program product, the computer program product comprising a computer readable storage medium having program instructions embodied therewith, the program instructions executable by a computer to cause the computer to:
determine, by a processor and using natural language processing, a writing style of content of a composed message written by a composer;
analyze, by the processor and using natural language processing, a set of previous messages written by the composer;

identify, by the processor and based on the analyzing, writing habits of the composer;

identify, by the processor, a difference between the writing style of the content and the writing habits of the composer; and display, by the processor and through a graphical user interface, a notification of the difference to the composer.

11. The computer program product of claim 10, further comprising:

classifying the composed message into a category; and wherein the set of previous messages is limited to messages that share the category with the composed message.

12. The computer program product of claim 11, wherein the category is chosen based on social-media information.

13. The computer program product of claim 11, wherein the category is a recipient category.

14. The computer program product of claim 11, wherein the category is a recipient-type category.

15. The computer program product of claim 11, wherein the category is a communication-medium category.

16. The computer program product of claim 10, further comprising weighting the value of the identified difference based on whether a word that contributed to the difference was automatically replaced during message composition.

17. The computer program product of claim 10, wherein the natural language processing comprises cross referencing terms with a database of contextual sources.

18. The computer program product of claim 10, wherein displaying a notification of the difference comprises suggesting a content modification to the composer, wherein the modification would reduce the difference.

19. A method comprising:

determining, by the processor and using natural language processing, a writing style of content of a composed message written by a composer;

analyzing, by the processor and using natural language processing, a set of previous messages written by the composer;

identifying, based on the analyzing, writing habits of the composer;

identifying, by the processor, a difference between the writing style of the content and the writing habits of the composer;

determining, by the processor and based on the difference, that the composer was in an impaired state when composing the message; and displaying, by the processor and through a graphical user interface, a notification of the difference to the composer after a pre-determined wait time, wherein the wait time is based on the magnitude of the difference identified between the writing style and the writing habits.

20. The method of claim 19, wherein the wait time is based on the type of difference identified between the writing style and the writing habits.

* * * * *